(No Model.) 2 Sheets—Sheet 1.
J. P. DAVISON.
CORN SHAVER.
No. 346,585. Patented Aug. 3, 1886.
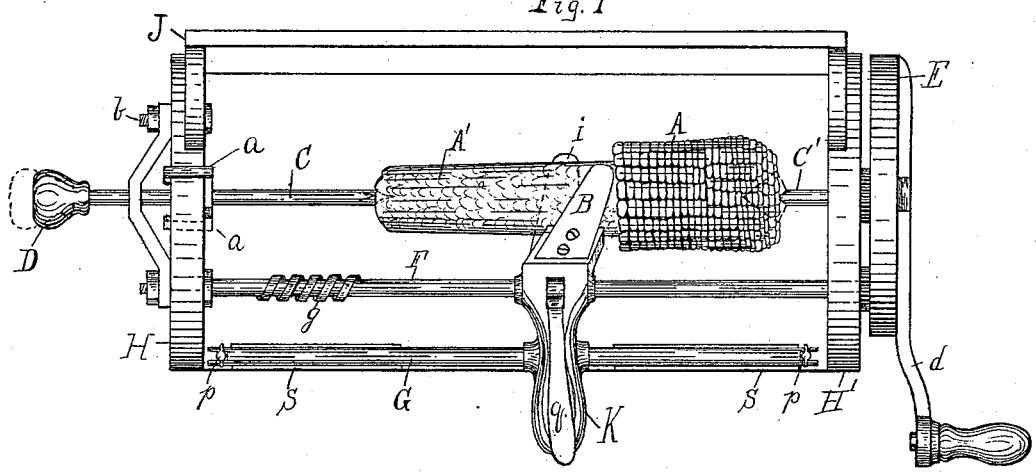
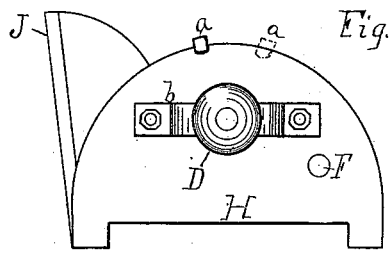
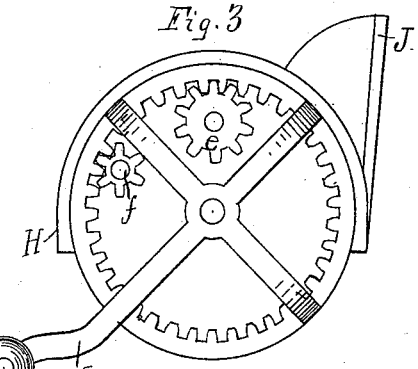
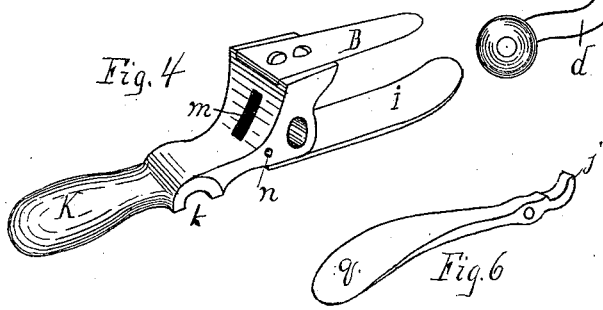
WITNESSES
Geo. A. Darby.
N. Davenport
INVENTOR
James P. Davison
by Geo. Amosher
atty.

(No Model.) 2 Sheets—Sheet 2.

J. P. DAVISON.
CORN SHAVER.

No. 346,585. Patented Aug. 3, 1886.

Witnesses.
A. Ruppert.
J. H. Trauernicht.

Inventor.
James P. Davison,
Per
Thomas P. Simpson,
Atty.

UNITED STATES PATENT OFFICE.

JAMES P. DAVISON, OF WATERVLIET, NEW YORK, ASSIGNOR OF ONE-HALF TO GEORGE W. DAVISON, OF SAME PLACE.

CORN-SHAVER.

SPECIFICATION forming part of Letters Patent No. 346,585, dated August 3, 1886.

Application filed October 24, 1885. Serial No. 180,815. (No model.)

*To all whom it may concern:*

Be it known that I, JAMES P. DAVISON, a resident of Watervliet, (P. O. West Troy,) in the county of Albany and State of New York, have invented certain new and useful Improvements in Corn-Shavers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in corn-shavers.

The object of my invention is to provide an easily-operated machine for cutting green corn from the cob.

Figure 7:
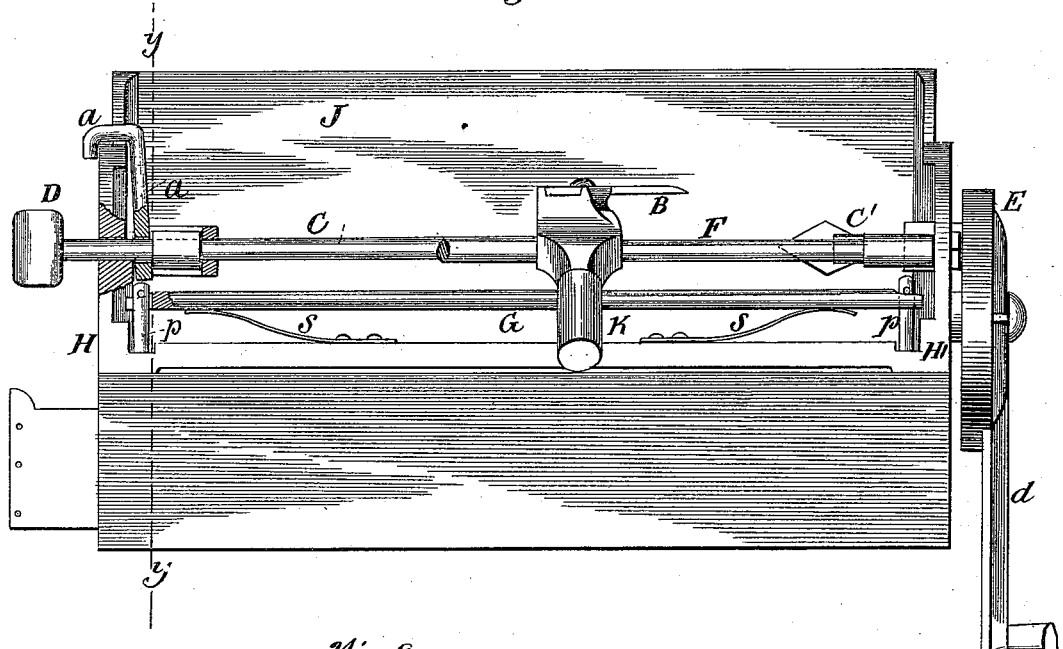
Figure 8:
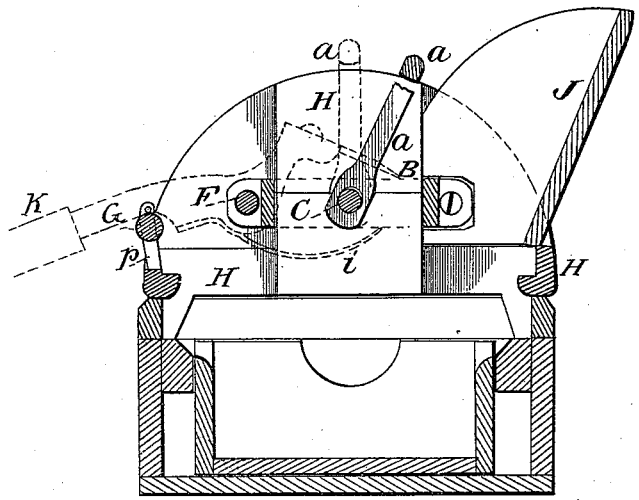

Figure 1 of the drawings is a top plan view of the machine supporting an ear of corn. Fig. 2 is an elevation of one end. Fig. 3 is an elevation of the opposite end. Fig. 4 is a view in perspective of the knife and handle. Fig. 5 is an end elevation of rod G and spring S, showing a side elevation of post $p$. Fig. 6 is a perspective view of finger $j$ detached. Fig. 7 is a front elevation; Fig. 8, a vertical cross-section on line $y\,y$ of Fig. 7, and Fig. 9 a detail view in perspective of the clamp-hook.

A is an ear of corn supported at one end by spindle C', and at the other end by spindle C. Spindle C' is provided at its projecting end with a blade, which pierces the end of the cob and forces the latter to rotate with the spindle, which is provided with suitable bearings in head H', and with a fixed pinion, $e$, adapted to engage with the interiorly-geared wheel E. Spindle C is provided with a center point adapted to engage with the other end of the cob, as shown by dotted lines, and form a pivot upon which the cob rotates, and is adapted to slide back and forth toward and from the cob in head H, and in supporting strap $b$, attached to the head, the spindle having a handle, D, by which it may be moved back and forth, as shown in dotted lines on Fig. 1 of the drawings, to release or secure the ear of corn.

Figure 9:
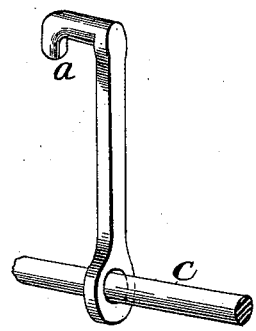

H is a vertical head, whose top surface is on a curve eccentric to the spindle C, while the clamp-hook $a$, constructed as shown in Fig. 9 of the drawings, is pivoted on said spindle and bears on said curved surface, so that by moving it up or down thereon the spindle may be fastened or unfastened.

The knife B is mounted on the handle K, and extends outwardly therefrom. Said handle is pivoted upon the rod F, as shown, so that it is adapted to travel longitudinally thereon, the end of the handle resting and sliding upon the rod G.

Upon turning the wheel E by handle $d$ or a belt upon the wheel the ear of corn is rotated, and when the knife is forced to and along the outer surface of the cob the kernels of corn are cut or shaved therefrom, as appears in Fig. 1.

The spring $i$, secured to the lower side of the handle, extends outwardly therefrom in a horizontal plane parallel with the plane of the knife, bears against the cob, and serves to keep said knife in contact therewith, to closely cut the corn therefrom. The knife B may also be held firmly to the cob by resting the handle K upon a loose rod, G, supported on springs S S, the rod being guided by and between the posts $p\,p$. The ends of the rod G are bifurcated and slide vertically upon the posts $p$, erected from the frame, as shown in Figs. 1 and 7 of the drawings.

The knife and handle can be moved along on rod F by hand to act upon the corn, as desired; or the rod F may be threaded throughout its length, as shown at $g$, and rotated in its bearings in heads H H' by means of a pinion, $f$, fixed thereon to engage with the toothed wheel E, as shown in Fig. 3 of the drawings.

When rod F is threaded I provide a handle, $q$, having a curved finger, $j$, which passes through slot $m$ in the handle, and is pivoted therein at $n$, as shown. The projecting handle $q$ is heavy enough to keep the finger $j$ in engagement with the threads $g$ of the rod F when the knife is used. When it is desired to slide the handle back to act upon another ear of corn, the handle $q$ is lifted, which disengages the finger from the threads and permits the knife to slide freely back and forth thereon.

I prefer to have the handle-aperture $k$, which receives rod G, without threads and large enough to slide freely back and forth on the rod.

What I claim as new, and desire to secure by Letters Patent, is—

1. In a corn-shaver, the handle K and the knife B, mounted thereon, in combination with the spring-plate $i$, attached to the handle and extending outward in a horizontal plane parallel to the plane of the knife, as and for the purpose described.

2. In a corn-shaver, the combination of the pivoted handle K, knife B, and spring-plate $i$, attached to said handle and arranged in horizontal parallel planes with respect to each other, the rods F G, and spindles C C', as and for the purpose set forth.

3. In a corn-shaver, the threaded rod F and the handle K, formed with the slot $m$, in combination with the handle $q$, pivoted in said slot, and having the curved finger $j$, as and for the purpose specified.

4. In a corn-shaver, the combination, with the loose spindle C, of the head H, having a curved surface eccentric to said spindle, and the clamp-hook $a$, pivoted to said spindle and bearing upon the curved surface of said head, as and for the purpose described.

In testimony whereof I have hereunto set my hand this 19th day of October, 1885.

JAMES P. DAVISON.

Witnesses:
  GEO. A. MOSHER,
  CHAS. L. ALDEN.